(No Model.)
E. A. LE SUEUR.
ELECTRICAL PROPULSION OF VESSELS.
No. 555,252. Patented Feb. 25, 1896.
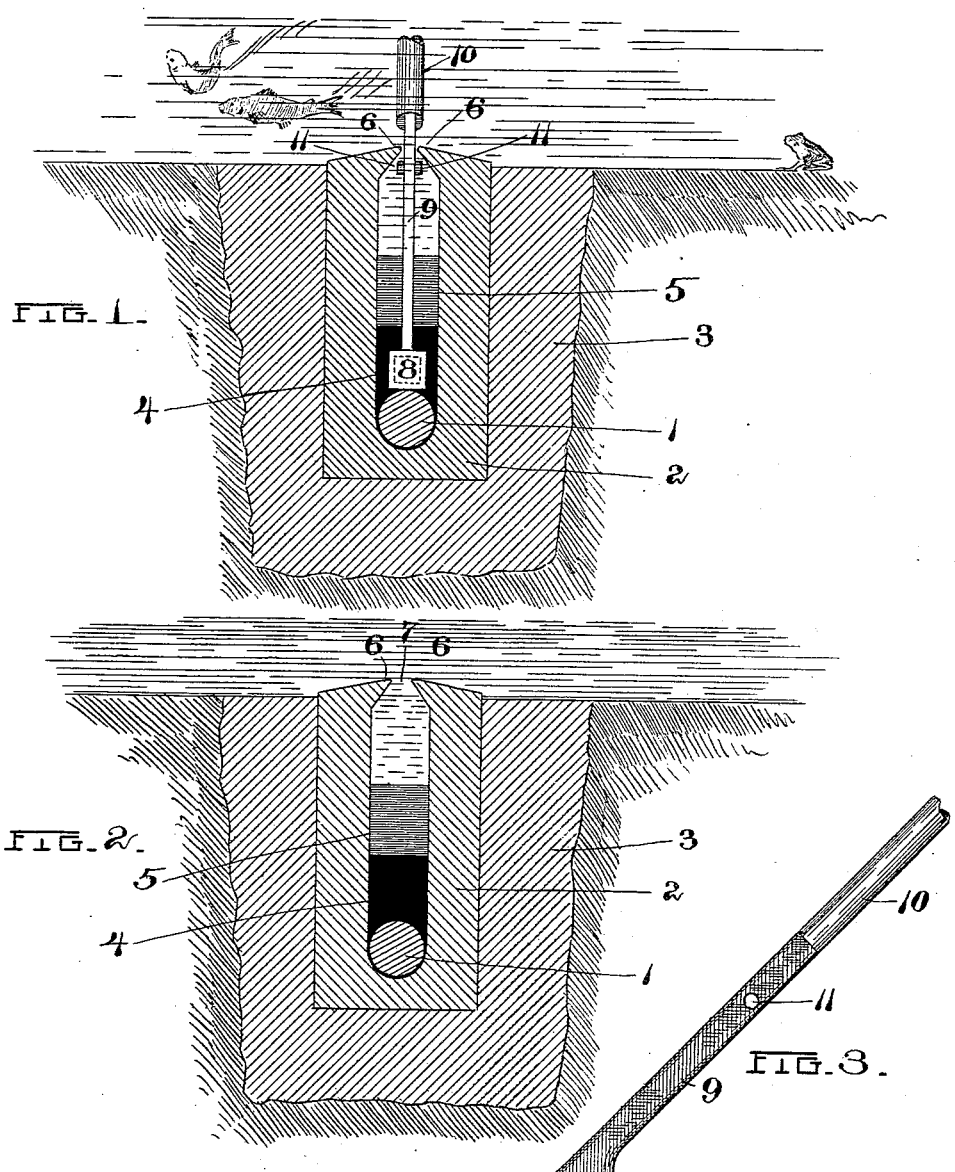

UNITED STATES PATENT OFFICE.

ERNEST ARTHUR LE SUEUR, OF OTTAWA, CANADA.

ELECTRICAL PROPULSION OF VESSELS.

SPECIFICATION forming part of Letters Patent No. 555,252, dated February 25, 1896.

Application filed March 26, 1894. Serial No. 505,049. (No model.)

*To all whom it may concern:*

Be it known that I, ERNEST ARTHUR LE SUEUR, a citizen of the Dominion of Canada, residing at Ottawa, in the county of Carleton and Province of Ontario, Canada, have invented certain new and useful Improvements in the Electrical Propulsion of Vessels, of which the following is a specification, reference being had therein to the accompanying drawings.

My invention has for its object an improvement in the electrical propulsion of boats on canals and the like; and it consists in means, which are hereinafter more fully set forth, by which an electrical conductor may be secured underneath the surface of the water, as also means by which the current may be drawn from the said conductor and transmitted to the motor on the boat, and also certain details of construction, which are hereinafter explained.

The novel features of my invention are pointed out in the claims, which are appended hereto.

I have shown my invention as embodied in the best form now known to me in the accompanying drawings, to which reference is made in the following description, and in which—

Figure 1 is a cross-sectional view of a portion of the bottom of a canal, showing my method of securing the conductor in place and also showing the device by means of which the current is transmitted from the conductor to the motor in the boat. Fig. 2 is a similar view with the said transmitting device removed. Fig. 3 is a side elevation of the device, by means of which connection is made with the conductor.

It has been proposed to propel boats on fixed courses—as, for example, canals, ferries, and the like—by the employment of electricity drawn from a suspended or overhead conductor by means of an overrunning trolley. Great difficulty has been encountered in such cases where crossings or switchings are necessary, as also in providing proper supporting devices over the channel. To obviate these and other objections, which are well known to those skilled in the art, I have devised the following:

I supply current to the vessel navigating the canal, river, or other body of water from the conductor 1 laid along the course which the vessel is to pass over in a conduit 2 of a cross-sectional shape (shown in Figs. 1 and 2) and which is made from earthenware or similar non-conducting material in proper sections or lengths. The conduit 2 is made up of a series of the said sections, which are placed end to end and properly united in any well-known manner to form a tight joint. The conduit may be laid on the bottom of the canal or other body of water and preferably in a bed of cement surrounding the conduit and indicated at 3. The chamber or interior cavity of the conduit is of sufficient depth to accommodate the conductor 1, as also a body of conducting fluid 4 surrounding said conductor and of greater specific gravity than water, and another body of insulating fluid 5 placed above the said conducting fluid and of less specific gravity than the fluid 4, but yet of greater specific gravity than water, and non-miscible with the latter and said conducting fluid, which serves to wholly protect the conductor and the conducting fluid and to prevent the escape of the current therefrom. The top of the conduit is contracted in any suitable manner, as by inwardly-projecting flanges 6, so as to leave only a narrow opening 7, through which the shank of the collecting device may pass.

The collecting device is preferably of the form shown in Fig. 3 and embraces a collector 8, which is preferably a hollow bar adapted to be slid along the conductor 1 to make contact therewith. A shank 9, which consists preferably of an enameled strip of metal, is secured to the collector 8 and projects forwardly therefrom at an angle, as shown. The upper end of the shank 9 is attached by suitable means to an insulated flexible cable 10, which extends upwardly to the vessel and by means of which the current is conveyed to the motor thereon. The angle at which the shank 9 is set permits the collector 8 to be dragged along the conductor more readily and with less danger of cramping than would be the case if the shank 9 was perpendicular. On each side of the shank 9 I secure two retaining-rolls 11, said rolls being placed at a point on said shank at which they will engage with the inner surfaces of the flanges 6 at the top of the conduit, as shown, Fig. 2, and will thus serve to prevent the collector from being raised from the conductor and out of the conducting solution accidentally. The contracted opening 7 at the top of the conduit also serves to lessen the amount of sediment which will pass into the conduit, as also to lessen the agitation of the water within the top of the conduit, which might result from the agitation of the water outside the conduit. I have shown the conductor as immersed in a conducting fluid within the bottom of the conduit, and I prefer to so immerse it; but I do not consider it absolutely necessary to employ such a conducting fluid. Any conducting fluid may be employed for this purpose, provided it is of greater specific gravity than the insulating fluid which overlies it. A heavy saline or other conducting solution, which may conveniently be a solution of sulphate of copper with or without the addition of sulphuric acid, may be employed for this purpose. For the insulating fluid 5 I prefer carbon disulphide or a mixture of carbon disulphide with an oil, although any insulating fluid of proper specific gravity may be employed.

As above stated, the conduit is preferably made of earthenware or the like, but it may be made of metal with an interior coating of insulating material. It will also be obvious that the current may be taken from the conductor by any well-known means, either a rubbing or a rolling contact being employed. I prefer, as above stated, a rubbing contact because of the relatively slow rate of motion of electrically-propelled vessels compared with that of electrically-driven cars, or I consider it more desirable still to take off the current from the conductor partly or wholly by electrolytic conduction through the heavy saline or other solution. The collector 8 is, as stated, preferably hollow, the air-space reducing its weight very materially. The flexible cable 10 should pass to the vessel at a considerable slant to avoid the binding of the collecting device in the conduit.

The arrangement above described in which the conductor is submerged in a conducting fluid is more particularly adapted for use with an alternating current. In case the current does not all flow through the contact-points of the metal surfaces it will easily flow partly or wholly through the conducting fluid and with an alternating current without appreciable chemical action on either metallic part. In case a direct current be employed the line conductor should be the negative pole and a platinum or platinized outside surface be used on the collector. In the latter case the conducting fluid will be preferably dilute sulphuric acid. It is advantageous to have the metallic line conductor immersed in an electrolyte, not only to prevent it from corrosion in case carbon disulphide is employed, but because any sediment that would gather in the conduit or holder might prevent metallic conduction between the conductor and the collector, but if metallic conduction were thus prevented conduction through the electrolyte would be perfect, even if the metallic surfaces were corroded or mud or sediment were present in such quantities as to wholly prevent metallic contact.

In the operation of my invention I prefer to have two line conductors, one at each side of the channel, to permit of unrestricted operation in both directions. The two lines preferably would be connected at the ends of each stretch, as in the case of a canal, at the opposite ends of each level, adjacent to the locks, by cross connecting-pieces, so that a vessel upon reaching the end of a section might drop its collector or tap-conductor, which would then be moved over to the other side of the channel to be taken by a vessel moving in the opposite direction. Line-switches may be arranged by branching the line conductors and conduits or holders in an obvious way. In the case of the form of conduit first described a separate line, with preferably separate trolley and trolley connections to be picked up and dropped by vessels passing each other on the switch, might be used. In the same manner crossings might be provided for.

For the purpose of introducing and removing the current-collectors I provide each stretch of line conduit or holder with one or more places where the conduit or holder is sufficiently enlarged at the opening to admit of the introduction or removal of the collectors, and the metallic line conductor may have the current brought to it at intervals along its length through connections with a suitable feeder, or, if desired, the feeder may be dispensed with. It would, therefore, not necessarily be continuous, but might advantageously be in sections, enabling the system to be run in blocks by the well-known method of block-feeders with means to throw off any section of the metallic line conductor which through an accident might become short-circuited. The ends of each stretch of conduit or holder will require to be walled up or closed, as will be obvious. I prefer to locate the enlargements for the introduction or removal of the collectors at the ends of said stretches or sections. As will be clear, a change of level of the conduit cannot be effected without closing the end of the conduit at one level and starting another length on the new level.

In the construction of the conduit the best method now known to me is to form the latter of short sections made from earthenware or similar material, the ends of said sections being ground true and fitted together with water-tight joints between the butted ends, which are obtained by compressing between said ends sheets of gutta-percha or similar substance cut to the shape of the conduit or holder.

I do not desire to limit myself to any particular method of securing the conduit in place underneath the surface or at the bottom of the canal or other body of water, as various well-known methods may be employed, and these matters are mere details of construction which may be varied to suit different localities and conditions, and are matters which are within the province of any constructer skilled in the art.

My invention presents a simple and efficient method by means of which vessels may be electrically propelled. By its use the overhead equipment and the means employed for supporting it are entirely avoided, and since the conductor is protected by its location underneath the water the system is durable and economical.

What I claim is—

1. The means herein set forth for the electrical propulsion of a vessel consisting of a conduit located beneath the surface of the water, a conductor in said conduit, insulating fluid of greater specific gravity than water within said conduit, and a contact or collecting device electrically connecting said conductor with the current-using device of the vessel, substantially as set forth.

2. The means herein set forth for the electrical propulsion of a vessel consisting of a conduit located beneath the surface of the water, a conductor in said conduit, conducting fluid surrounding said conductor and in contact therewith, insulating fluid within said conduit insulating said conducting fluid from the water, and a contact or collecting device electrically connecting said conductor with the current-using device of the vessel, substantially as set forth.

3. The means herein set forth for the electrical propulsion of a vessel, consisting of a conduit located beneath the surface of the water, a conductor placed therein and immersed in a conducting fluid, an insulating fluid of greater specific gravity than water insulating said conductor and said conducting fluid, and a collector or contact-maker comprising a rubbing contact, an arm extending therefrom, and a flexible connection intermediate the arm and the motor on a vessel, substantially as set forth.

4. The combination of a conduit having a contracted opening at the top thereof, a conductor within said conduit, conducting fluid surrounding said conductor, insulating fluid for insulating said conducting fluid, a movable collector or contact device extending into the conduit and in electrical connection with the conductor, and a retaining device on the collector connection whereby the collector is prevented from being withdrawn from the conduit, substantially as set forth.

In testimony whereof I affix my signature in presence of two witnesses.

ERNEST ARTHUR LE SUEUR.

Witnesses:
J. BISHOP,
L. A. SMITH.